(No Model.)

2 Sheets—Sheet 1.

P. DIEHL.
ELECTRIC MOTOR.

No. 324,667.   Patented Aug. 18, 1885.

WITNESSES:
E. D. Smith

INVENTOR
Philip Diehl,
BY
ATTORNEY (No Model.) 2 Sheets—Sheet 2.

P. DIEHL.
ELECTRIC MOTOR.

No. 324,667. Patented Aug. 18, 1885.

WITNESSES:
E. D. Smith

INVENTOR
Philip Diehl,
BY
ATTORNEY

UNITED STATES PATENT OFFICE.

PHILIP DIEHL, OF ELIZABETH, NEW JERSEY.

ELECTRIC MOTOR.

SPECIFICATION forming part of Letters Patent No. 324,667, dated August 18, 1885.

Application filed May 15, 1885. (No model.)

*To all whom it may concern:*

Be it known that I, PHILIP DIEHL, a citizen of the United States, residing at Elizabeth, in the county of Union and State of New Jersey, have invented certain new and useful Improvements in Electric Machines, of which the following is a specification, reference being had therein to the accompanying drawings.

My invention relates to electric machines of that class in which an armature is rotated in a magnetic field adjacent to the poles of a field-magnet; and the principal object of my invention is to provide certain means whereby the magnetic action of the field-magnet on the armature may be varied or entirely arrested without affecting the resistance in the circuit in which the machine may be connected to such an extent as to appreciably vary the speed of other motors working in the same circuit. Thus by my invention the speed of revolution of the armature of one of several motors connected in the same circuit may be varied or the movement entirely suspended without changing the wire resistance of the electric current or without breaking the circuit, and the operation of the other motors in the circuit will thus be undisturbed.

In carrying my invention into effect I form the field-magnet of two hinged portions, between the poles of which the revolving armature is placed, the poles being thus movable from or toward the armature, so that the latter is more or less affected, according to its position, by the magnetism of the said poles, or by swinging the latter a sufficient distance from the armature the magnetic force on the latter will be so weakened that its revolution will be entirely suspended. In connection with the swinging pole-pieces of the magnet I provide means for locking them in any position in which they may be adjusted, and I also prefer to use an armature and commutator of peculiar construction.

Figure 1:
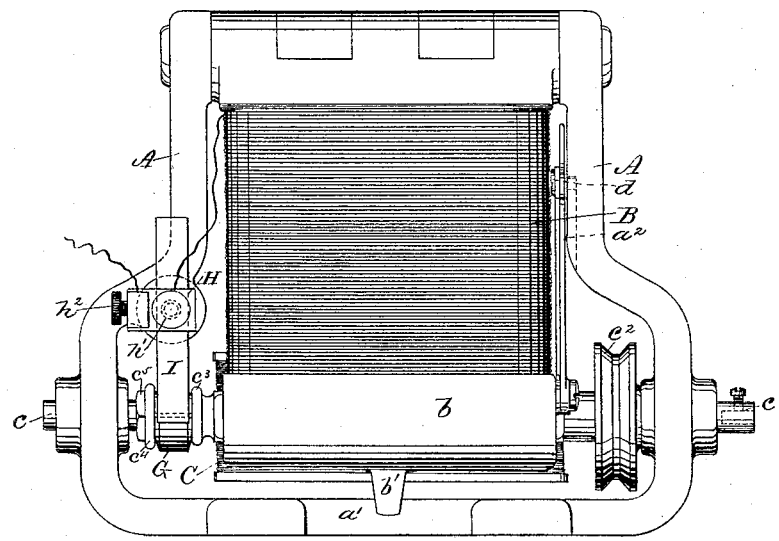
Figure 2:
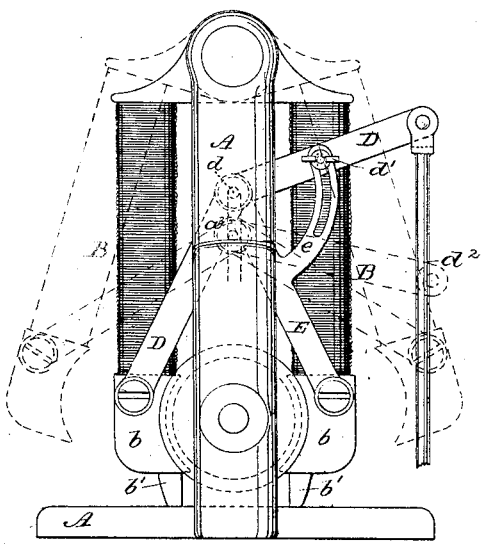
Figure 3:
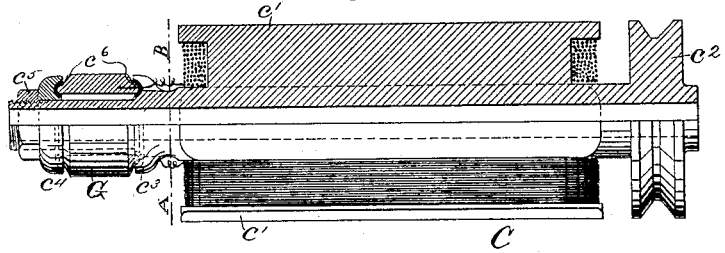
Figure 4:
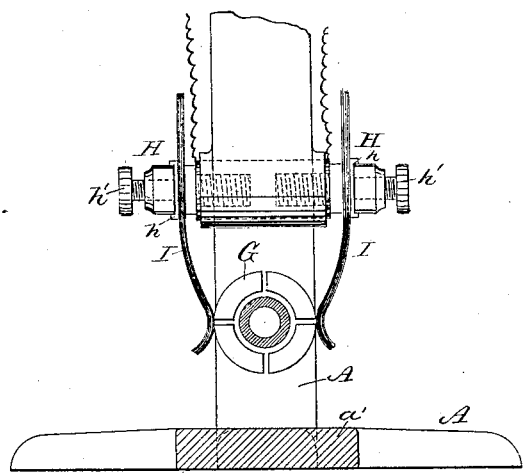
Figure 5:
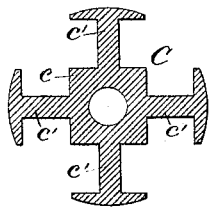
Figure 6:
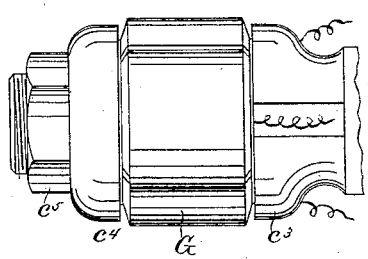
Figure 7:
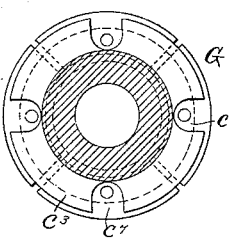
Figure 8:
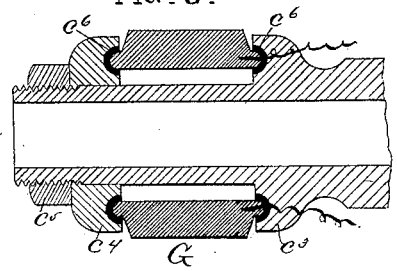

In the drawings, Figure 1 is a side elevation of an electric motor embodying my invention, and Fig. 2 is an end view thereof. Fig. 3 is a detail view, partly in section, of the armature and commutator. Fig. 4 is a partial side view showing the brushes and commutator. Fig. 5 is a cross-section of the armature-frame; and Figs. 6, 7, and 8 are detail views of the commutator.

A indicates the frame of my machine, said frame being of brass or other non-magnetic metal. The field-magnet consists of two hinged portions, B, pivoted to the upper portion of the frame, and having poles $b$, between which is placed the revolving armature C. The armature is preferably secured to a spindle, $c$, journaled in bearings $a$ of the frame A; but it is obvious that instead of using this spindle the armature might revolve on center-screws passing through the frame. The spindle is, however, considered the best, as it affords ready means of attachment of a flexible shaft, as by a socket and set-screw, such as is shown to the right in Fig. 1. The poles $b$ are provided with lugs $b'$, adapted to abut against the cross-bar $a'$ of the frame A, and thus limit the movements of the said poles toward the armature.

The parts B, constituting the field-magnet, are wound with insulated copper wire in the usual manner, and the terminals of the wire are fastened to the brush-holders when the magnet is shunt-wound; or one of the terminals is fastened to a brush-holder and the other to the source of electricity when the magnet is series-wound.

The mechanism for adjusting the poles of the field-magnet relative to the armature which I have herein shown consists of a lever, D, attached to one pole $b$, and connected near its center by a screw or pin, $d$, to a link, E, attached to the other pole $b$. The pin $d$ extends into a guiding-slot, $a^2$, in the frame A, which causes said pin to move vertically when the outer end of the lever D is depressed. The link E and the lower arm of the lever D thus form a toggle connected with both poles of the magnet, and as the outer end of the said lever and the connecting-pin $d$ are depressed or raised, the poles of the magnet will be simultaneously moved from or toward the armature C, thus lessening or increasing the action of the field-magnet thereon.

In connection with the swinging poles of the magnet I prefer to provide a device for securing them in any desired position relative to the armature, such securing device consisting in the present instance of a curved slotted arm, e, on the link E, and a screw and set-nut, d', attached to the upper arm of the lever D.

The lever D may be lowered and raised by the hand of the operator or by means of a rod, as d², connected with a suitable treadle, and after the poles of the magnet are adjusted to the desired position they may be secured by tightening the set-nut d'.

The armature C consists of a square shaft, c, having four T-shaped arms, c', wound with insulated copper wire. A pulley, c², is cast on one end of the shaft c, and near the other end of the said shaft is formed a flange, c³, serving as a seat or holder for the pieces or sections of the commutator G, said sections being held between said flange, and a clamping-collar, c⁴, secured to the shaft by a set-nut, c⁵. Washers c⁶, of insulating material, are placed between the sections of the commutator and the said flange and collar, the faces of the latter, which are adjacent to the commutator, being preferably recessed, as shown, for the reception of said washers and ribs on the edges of the commutator-sections.

The wire on the arms c' is connected together in such a manner as to form a continuous circuit—that is to say, the ending terminal of the wire on one arm is connected to the beginning terminal of the wire on the next arm, and so on for all of the arms, and each beginning terminal is also connected to one of the sections of the commutator, the latter having as many sections as the armature has arms or projections.

To facilitate the connection of the sections of the commutator with the wire of the armature, the flange c³ is provided with notches c⁷, as clearly shown in Fig. 7.

The brush-holders H are insulatingly attached to the frame A, and the brushes I, consisting preferably of thin strips of sheet-copper, are secured in the holders by clamping-blocks h and set-screws h'. Each brush-holder is also provided with a binding-screw, h², for the terminals of the electric circuit in which the motor is connected.

My motor is specially adapted for running sewing and other small machines; but is of course capable of use for a variety of purposes. In using the motor it is important that its speed should be easily regulated, and this is readily accomplished by the mechanism above described. In operation it is also frequently desirable to connect several motors in the same circuit, and in such instances it is essential that the speed of one motor may be capable of being varied or the motor stopped altogether without affecting the operation of the others. This desideratum is also effected by my invention. The electric current enters at one of the binding-screws h² and passes through the field-magnet, leaving the motor at the other binding-screw. The magnet being energized by the passage of the current, the armature is acted upon in the usual manner by the poles thereof, and is caused to rotate in the magnetic field. To lessen the speed of revolution of the armature, the poles are swung away therefrom, thus decreasing their magnetic action on the armature, and to suspend the operation of the latter entirely it is only necessary to swing the poles outward a sufficient distance (as to the position indicated by dotted lines in Fig. 2) to lessen the magnetic action of the poles on the armature to such a degree that the friction of the latter or the weight which it carries will more than counterbalance the power applied. The motion of the armature may thus be varied or entirely suspended without breaking the circuit or disturbing the wire resistance thereof, the electric current passing uninterruptedly through the magnet, whatever may be the position of its poles relative to the armature.

It will be understood that my armature and commutator, constructed in the manner described, and also the locking device for the movable poles, are adapted for use with dynamos as well as motors.

The construction of the locking device may be varied, as by forming the arm on the lever and attaching the securing-screw and set-nut to the link; or a locking device such as is shown in my application No. 142,475, filed September 8, 1884, may be employed without departing from my invention.

Having thus described my invention, I claim and desire to secure by Letters Patent—

1. In an electric motor, the combination, with a rotary armature and a field-magnet having movable poles, of an adjusting mechanism comprising one or more levers for varying the position of said poles relative to said armature, as set forth.

2. In an electric motor, the combination, with a rotary armature, of a field-magnet having swinging poles adapted to be removed from the armature to such a distance that their magnetism is insufficient to rotate said armature, whereby the motor may be stopped without breaking the circuit in which it is connected or without varying the wire resistance thereof, substantially as set forth.

3. In an electric motor, the combination, with a rotary armature, of a field-magnet having swinging poles, a lever attached to one of said poles and having a movable fulcrum-pin, and a link attached to the other of said poles and also to said pin, substantially as set forth.

4. The combination, with a rotary armature and a field-magnet having one or more movable poles, of a locking device, substantially as described, for securing the latter in any desired position, as set forth.

5. The combination, with a rotary armature and a field-magnet having one or more movable poles, of an adjusting mechanism comprising one or more levers for varying the position of said poles relative to said armature, and a locking mechanism for securing said pole in any desired position after adjustment, substantially as set forth.

6. The combination, with a rotary armature and a field-magnet having swinging poles, of a lever and link connected together and to said poles, a curved slotted arm, and a screw and set-nut whereby said poles may be secured in any desired position, substantially as set forth.

7. A rotary armature the body of which consists of a square shaft having T-shaped arms, said shaft having also a flange or seat for the commutator and a pulley integral therewith, substantially as set forth.

8. The combination, with the armature and commutator, of a shaft by which both are carried, said shaft having a flange forming one of the seats for the commutator-sections, and said flange being provided with recesses or notches at $c^7$, to facilitate the connection of the commutator-sections and the armature-arms, substantially as set forth.

In testimony whereof I affix my signature in presence of two witnesses.

PHILIP DIEHL.

Witnesses:
E. T. BRADY,
J. F. JAQUITH.